(12) United States Patent
Liu

(10) Patent No.: US 12,164,453 B2
(45) Date of Patent: Dec. 10, 2024

(54) HUB WITH AUDIO SIGNAL SHARING

(71) Applicant: Magic Control Technology Corporation, New Taipei (TW)

(72) Inventor: Pei-Chung Liu, New Taipei (TW)

(73) Assignee: Magic Control Technology Corporation, New Tapei (TW)

( * ) Notice: Subject to any disclaimer, the term of this patent is extended or adjusted under 35 U.S.C. 154(b) by 0 days.

(21) Appl. No.: 18/107,680

(22) Filed: Feb. 9, 2023

(65) Prior Publication Data

US 2023/0315664 A1    Oct. 5, 2023

(30) Foreign Application Priority Data

Mar. 30, 2022    (TW) .................................. 111112268

(51) Int. Cl.
*G06F 13/38*    (2006.01)
*G06F 3/16*    (2006.01)

(52) U.S. Cl.
CPC ............ *G06F 13/385* (2013.01); *G06F 3/162* (2013.01); *G06F 2213/4004* (2013.01)

(58) Field of Classification Search
None
See application file for complete search history.

(56) References Cited

U.S. PATENT DOCUMENTS

| | | | |
|---|---|---|---|
| 9,113,497 B2 * | 8/2015 | Smith, II | ............... H04W 88/06 |
| 9,554,061 B1 | 1/2017 | Proctor, Jr. et al. | |
| 10,255,219 B2 * | 4/2019 | Jensen | .................... G06F 3/165 |

(Continued)

FOREIGN PATENT DOCUMENTS

| | | |
|---|---|---|
| CN | 201210686 Y | 3/2009 |
| CN | 113692719 A | 11/2021 |

(Continued)

OTHER PUBLICATIONS

European search Report of European Application No. 23156007.9-1224.

(Continued)

*Primary Examiner* — Farley Abad
*Assistant Examiner* — Dayton Lewis-Taylor
(74) *Attorney, Agent, or Firm* — Millen, White, Zelano & Branigan P.C.; Wan-Ching Montfort

(57) ABSTRACT

A hub includes: a multi-function control unit; a microprocessor; at least one sharing port connected to the multi-function control unit, which controls the at least one sharing port to connect with a computing device; a USB audio control unit connected to the multi-function control unit; an audio processing module connected to the USB audio control unit and the microprocessor; a wireless module connected to the audio processing module and the microprocessor and used for wireless communication with a mobile device; and an audio input and output module connected to the audio processing module and the microprocessor, and including an audio cable jack used for connecting with an audio input and output device, and/or a built-in speaker and a microphone. The microprocessor controls the audio processing module to select and process audio signal sharing among the computing device, the mobile device, and the audio input and output device.

7 Claims, 4 Drawing Sheets

(56) References Cited

U.S. PATENT DOCUMENTS

| | | | |
|---|---|---|---|
| 2008/0172512 A1* | 7/2008 | Wu | G06F 13/385 |
| | | | 710/301 |
| 2015/0029897 A1 | 1/2015 | Radhakrishnan et al. | |
| 2015/0356045 A1 | 12/2015 | Soffer | |
| 2015/0358553 A1 | 12/2015 | Cox | |
| 2017/0374462 A1 | 12/2017 | Chalabi et al. | |
| 2018/0173661 A1 | 6/2018 | Rand et al. | |
| 2020/0005800 A1 | 1/2020 | Shi | |
| 2020/0174740 A1 | 6/2020 | Martay et al. | |
| 2020/0183974 A1 | 6/2020 | Park et al. | |
| 2020/0201593 A1 | 6/2020 | Zhang | |

FOREIGN PATENT DOCUMENTS

| | | |
|---|---|---|
| CN | 113994548 A | 1/2022 |
| TW | 201320964 A | 6/2013 |
| TW | 201706858 A | 2/2017 |
| TW | M577128 U | 4/2019 |

OTHER PUBLICATIONS

First Office Action in Taiwanese Patent Application No. 111112268 dated Dec. 2, 2022.
English translation of Taiwanese Patent Application No. 111112268 Search Report dated Dec. 2, 2022.
English Abstract of CN201210686, Publication Date: Mar. 18, 2008.
English Abstract of TW201320964, Publication Date: Jun. 1, 2013.
English Abstract of CN113692719, Publication Date: Nov. 23, 2021.
TW Search Report dated Aug. 5, 2024 issued in corresponding Application No. 111112268 (14 pages).
Infobit Products Catalog, Version V2.0 (2021).
www.dlink.com—8-in-1 USB-C Hub with HDMI/Ethernet/Card Reader/Power Delivery.
www.logitech.com/rally—Logitech Rally Datasheet (2018).
Logitech—Logitech Rally and Rally Plus Implementation Guide.

* cited by examiner

HUB WITH AUDIO SIGNAL SHARING

CROSS-REFERENCE TO RELATED APPLICATION

This application claims the priority of Taiwanese patent application No. 111112268, filed on Mar. 30, 2022.

BACKGROUND OF THE INVENTION

1. Field of the Invention

The present invention relates to a hub, and in particular to a hub with audio signal sharing.

2. The Prior Art

When a plurality of terminals, such as mobile phones, tablet PCs, and computing devices, share audio signals, if a complicated and high-cost server network is used, the above-mentioned audio signal sharing can only be performed through a server, so that the sharing is very inconvenient and difficult.

In addition, in order to connect terminals, such as mobile phones, tablet PCs, and computing devices, with other devices, data interfaces for example earphones, USB-C interfaces, or USB-A interfaces are provided on existing terminals. However, the number of data interfaces of the terminals is limited, and thus the number of the devices connected thereto is limited.

Therefore, it is necessary to provide a technical solution for allowing multiple terminals, such as mobile phones, tablet PCs, and computing devices, to share the audio signals more effectively.

SUMMARY OF THE INVENTION

In order to achieve the purpose of effectively solving the above problems, the present invention provides a hub with audio signal sharing including a multi-function control unit, a microprocessor, at least one sharing port, a USB audio control unit, an audio processing module, a wireless module, and an audio input and output module. The at least one sharing port and the USB audio control unit are connected to the multi-function control unit. The multi-function control unit controls the at least one sharing port to connect with a computing device. The wireless module is connected to the audio processing module and the microprocessor so as to be used for wireless communication with a mobile device. The audio input and output module is connected to the audio processing module and the microprocessor and includes an audio cable jack used for connecting with an audio input and output device, and/or a built-in speaker and a microphone. The microprocessor controls the audio processing module to select and process audio signal sharing among the computing device, the mobile device, and the audio input and output device.

According to an embodiment of the present invention, the hub further includes at least one multi-function connection port connected to the multi-function control unit.

According to an embodiment of the present invention, the hub further includes at least one image connection port; and an image control unit connected to the multi-function control unit and the at least one image connection port.

According to an embodiment of the present invention, the hub further includes a power unit connected to the multi-function control unit and the image control unit, and connected to a power connection port.

According to an embodiment of the present invention, the at least one sharing port includes a USB-C port.

According to an embodiment of the present invention, the at least one image connection port includes an HDMI port.

According to an embodiment of the present invention, the at least one multi-function connection port includes a network port, a card reader port, and a USB3.0 port.

The hub of the present invention may allow multiple terminals, such as mobile phones, tablet PCs, and computing devices, to share audio signals more effectively.

DETAILED DESCRIPTION OF THE PREFERRED EMBODIMENT

Figure 1:
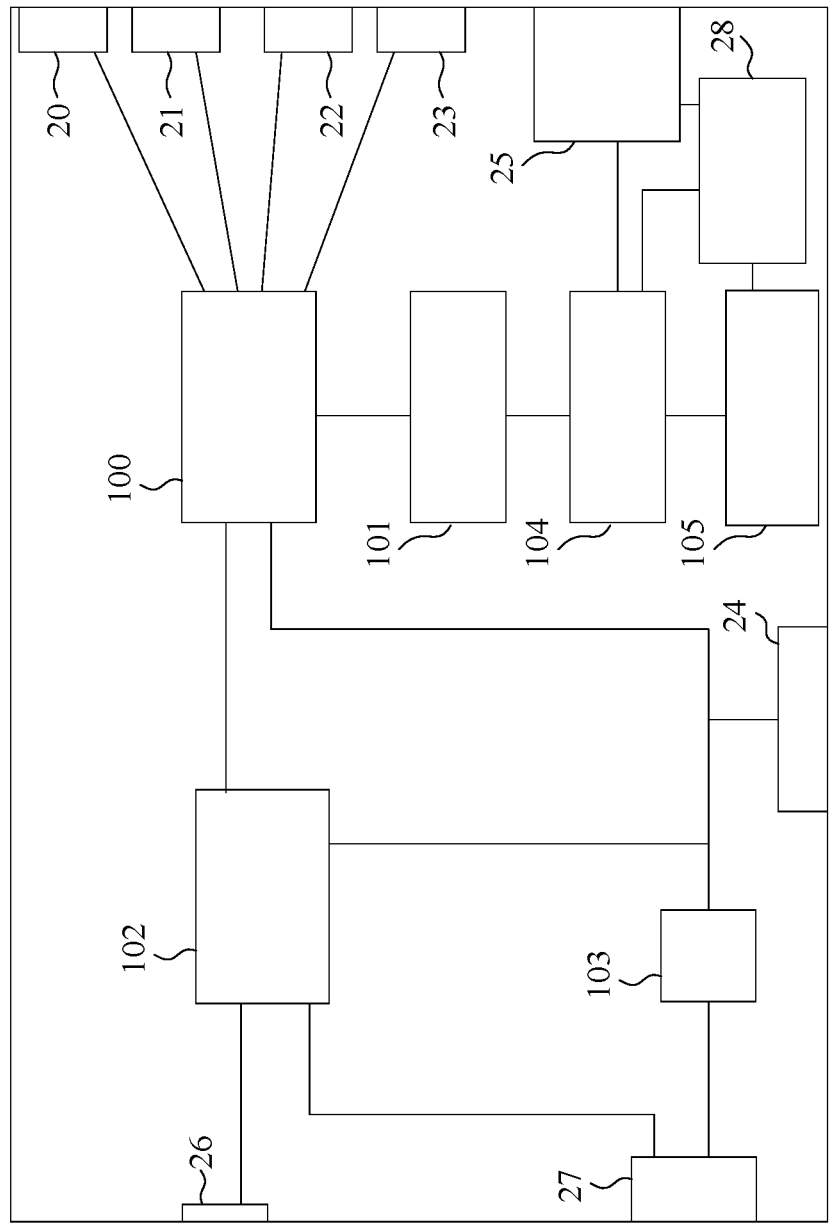
FIG. 1 is a block diagram of a hub according to an embodiment of the present invention.

Please refer to FIG. 1, which is a block diagram of a hub according to an embodiment of the present invention. As shown in FIG. 1, the hub 1 includes a multi-function control unit 100, a microprocessor 28, at least one sharing port, a USB audio control unit 101, an audio processing module 104, a wireless module 105, and an audio input and output module 25. The at least one sharing port and the USB audio control unit 101 are connected to the multi-function control unit 100. Here, the at least one sharing port is a USB-C port 24, and the USB-C port 24 is used for connecting a laptop, desktop computer, tablet PC, etc. The multi-function control unit 100 controls the at least one sharing port to connect with a computing device 2 (see FIG. 2). The wireless module 105 is connected to the audio processing module 104 and the microprocessor 28 so as to be used for wireless communication with a mobile device 3 (see FIG. 2) via the Bluetooth communication protocol in this embodiment. The audio input and output module 25 is connected to the audio processing module 104 and the microprocessor 28 and is used to connect an audio input and output device 4 (see FIG. 2). An audio cable connection hole 29 of the audio input and output module 25 generally can be connected to the audio input and output device 4 by a 3.5 mm audio cable. If the audio input and output device 4 has a wireless connection function, it can also be connected to the hub 1 through the wireless module 105 by wireless communication, such as the above-mentioned Bluetooth communication protocol. The microprocessor 28 controls the audio processing module 104 to select and process audio signal sharing among the computing device 2, the mobile device 3, and the audio input and output device 4.

According to the embodiment of the present invention, the multi-function control unit 100 may include or be implemented as a USB 3.1 Gen 1 hub controller, such as VIA Labs, Inc.'s product VL817 or Genesys Logic, Inc.'s product GL3523.

According to the embodiment of the present invention, the USB audio control unit 101 may include or be implemented as a highly integrated single chip USB audio solution, such as C-Media Electronics, Inc.'s product HS100B.

According to the embodiment of the present invention, the audio processing module 104 may include or be implemented as Nuvoton Technology Corporation's product NAU88C22.

According to the embodiment of the present invention, the wireless module 105 may include or be implemented as Actions Technology Co., Ltd.'s product ATS2835.

According to the embodiment of the present invention, the microprocessor 28 may include or be implemented as ARM Cortex-MO MCUs produced by Nuvoton Technology Corporation.

In the embodiment of the present invention, the hub 1 may further include at least one multi-function connection port, and the at least one multi-function connection port includes USB3.0 connection ports 20, 21, a card reader port/memory card port 22, and a network port 23 so as to be used for inserting a memory card and connecting a network by wired communication.

According to the embodiment of the present invention, the card reader port/memory card port 22 may include or be implemented as a USB 3.1 Gen 1 Dual/Single LUN card reader controller, such as Genesys Logic, Inc.'s product GL3224.

The hub 1 further comprises at least one image connection port and an image control unit 102 connected to the multi-function control unit 100 and the at least one image connection port. The at least one image connection port includes an HDMI port 26 for connecting the computing device 2 to share audio signals, and the HDMI port 26, which is the same as the USB-C port 24, can also be used to connect with laptops, desktop computers and tablet PCs.

According to the embodiment of the present invention, the image control unit 102 may include or be implemented as a Display Port (DP) to HDMI video interface converter, such as ITE Tech, Inc.'s product IT6563 or Parade Technologies, Ltd.'s product PS176.

It should be noted that, in other embodiments of the present invention, the number of the at least one image connection port, the at least one multi-function connection port, and the at least one sharing port can be increased according to actual requirement. The embodiment is only for example, not to limit the present invention.

In addition, the hub 1 includes a power unit 103. The power unit 103 is connected to the multi-function control unit 100 and the image control unit 102, and is connected to a power connection port, i.e., a USB-C port 27.

According to the embodiment of the present invention, the power unit 103 may include or be implemented as a Type-C power delivery controller, such as Realtek Semiconductor Corp.'s product RTS5400, Texas Instruments Incorporated's product TPS65994AD, or Genesys Logic, Inc.'s product GL9510. Alternately, the power unit 103 may include or be implemented as a Display Port alternate mode controller, such as VIA Labs, Inc.'s product VL100.

Figure 2:
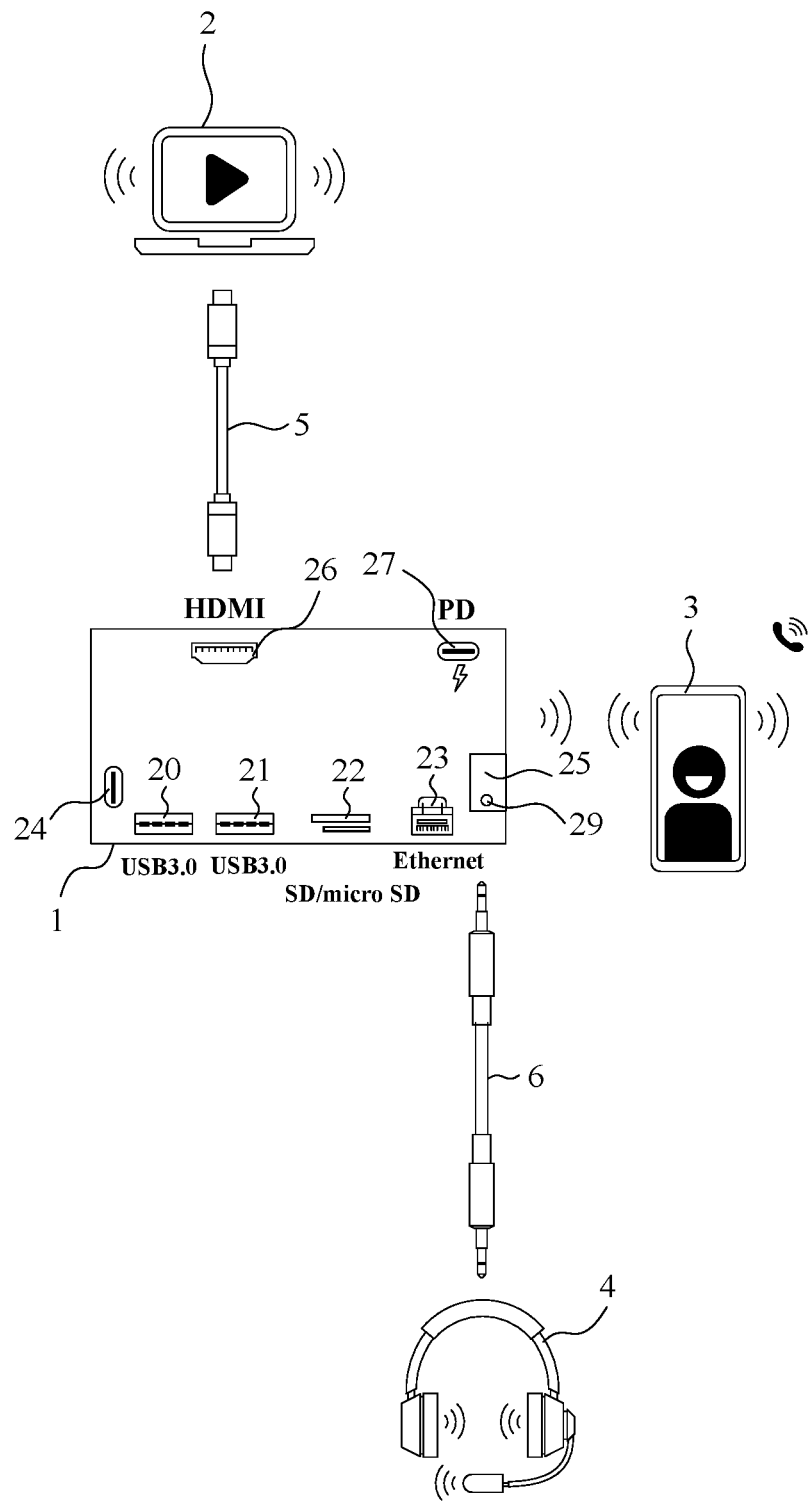
FIGS. 2, 3 and 4 are schematic diagrams of scenarios of using the hub according to various embodiments of the present invention.

Please refer to FIG. 2, which is a schematic diagram of a scenario of using the hub according to an embodiment of the present invention. As shown in FIG. 2, the present invention provides a hub 1 with audio signal sharing, which is connected to the computing device 2 by an audio and video cable 5, connected to the mobile device 3 by wireless communication, and connected to the audio input and output device 4 by an audio cable 6. In addition, if the audio input/output device 4 has a wireless connection function, the hub 1 can also be connected by wireless communication. In this embodiment, the audio and video cable 5 can be a USB-C cable or an HDMI cable, the audio cable 6 can be a usual 3.5 mm audio cable, the computing device 2 can be a laptop, and the mobile device 3 can be a mobile phone or a tablet PC, and the audio input and output device 4 can be a headset microphone. The hub 1 allows the laptop, the mobile phone, and the headset microphone connected together to transmit and share audio signals, such as a multi-party call, through a communication software.

Figure 3:
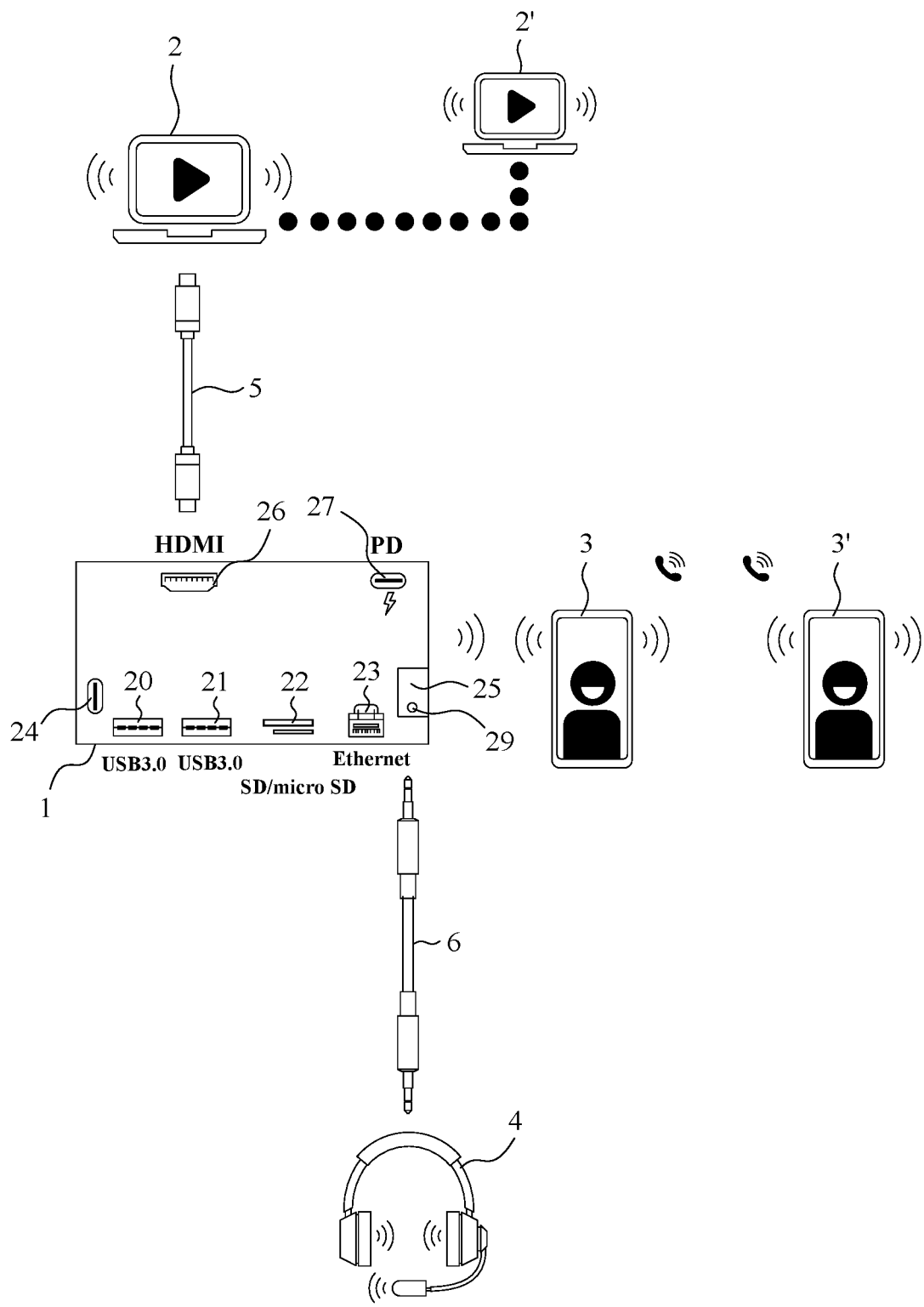

Please refer to FIG. 3, which is a schematic diagram of a scenario of using the hub according to an embodiment of the present invention. As shown in FIG. 3, the present invention provides a hub 1 with audio signal sharing, which is connected to the computing device 2 by an audio and video cable 5, connected to the mobile device 3 by wireless communication, and connected to the audio input and output device 4 by an audio cable 6. Meanwhile, a computing device 2' wirelessly communicates with the computing device 2, and a mobile device 3' wirelessly communicates with the mobile device 3. In this embodiment, the audio and video cable 5 can be a USB-C cable or an HDMI cable, the audio cable 6 can be a usual 3.5 mm audio cable, the computing device 2 and the computing device 2' can be laptops, and the mobile device 3 and the mobile device 3' can be mobile phones or tablet PCs, and the audio input and output device 4 can be a headset microphone. The hub 1 allows a laptop (the computing device 2), a mobile phone (the mobile device 3), a headset microphone, another laptop (the computing device 2') wirelessly connected to the laptop (the computing device 2), and another mobile phone (the mobile device 3') wirelessly connected to the mobile phone (the mobile device 3) to transmit and share audio signals with each other, such as a multi-party call, through a communication software.

Figure 4:
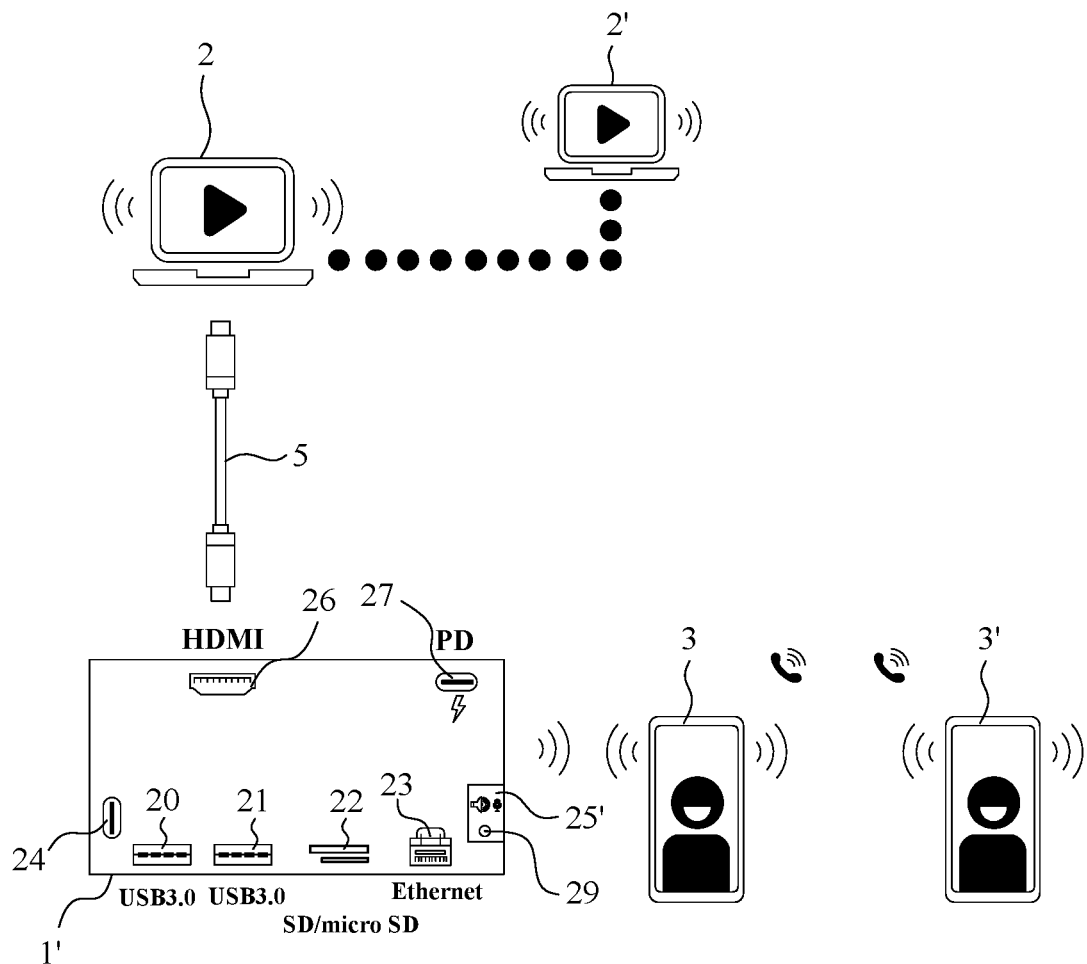

Please refer to FIG. 4, which is a schematic diagram of a scenario of using the hub according to an embodiment of the present invention. As shown in FIG. 4, the present invention provides a hub 1' with audio signal sharing, which is connected to the computing device 2 by an audio and video cable 5, and connected to the mobile device 3 through wireless communication. Meanwhile, a computing device 2' performs wireless communication with the computing device 2, and a mobile device 3' performs wireless communication with the mobile device 3. In this embodiment, the audio and video cable 5 can be a USB-C cable or an HDMI cable, and the audio input and output module 25' may include an audio cable connection hole 29, and/or a built-in speaker for playing audio and a microphone for receiving audio, the computing device 2 and the computing device 2' can be laptops, and the mobile device 3 and the mobile device 3' can be mobile phones or tablet PCs. The hub 1' allows a laptop (the computing device 2), a mobile phone (the mobile device 3), another laptop (the computing device 2') wirelessly connected to the laptop (the computing device 2), and another mobile phone (the mobile device 3') wirelessly connected to the mobile phone (the mobile device 3) to transmit and share audio signals with each other, such as a multi-party call, through a communication software.

In summary, the hub of the present invention may allow multiple terminals, such as mobile phones, tablet PCs, and computing devices, to share audio signals more effectively.

What is claimed is:
1. A hub with audio signal sharing comprising:
a multi-function control unit;
a microprocessor;
at least one port connected to the multi-function control unit, which controls the at least one port to connect with a computing device;
a universal serial bus (USB) audio control unit connected to the multi-function control unit;
an audio processing module connected to the USB audio control unit and the microprocessor;

a wireless module connected to the audio processing module and the microprocessor so as to be used for wireless communication with a mobile device; and an audio input and output module connected to the audio processing module and the microprocessor, and including an audio cable jack used for connecting with an audio input and output device, and/or a built-in speaker and a microphone, wherein the microprocessor controls the audio processing module to select and process audio signals among the computing device, the mobile device, and the audio input and output device, to enable these devices to conduct a multi-party call, so that each of these devices receives audio signals from other devices simultaneously and play the received audio signals simultaneously.

2. The hub according to claim 1, further comprising at least one multi-function connection port connected to the multi-function control unit.

3. The hub according to claim 2, wherein the at least one multi-function connection port includes a network port, a card reader port, and a USB3.0 port.

4. The hub according to claim 1, further comprising at least one image connection port; and an image control unit connected to the multi-function control unit and the at least one image connection port.

5. The hub according to claim 4, further comprising a power unit connected to the multi-function control unit and the image control unit, and connected to a power connection port.

6. The hub according to claim 4, wherein the at least one image connection port includes a high definition multimedia interface (HDMI) port.

7. The hub according to claim 1, wherein the at least one port includes a USB-C port.

* * * * *